(12) United States Patent
Chen et al.

(10) Patent No.: US 9,488,530 B2
(45) Date of Patent: Nov. 8, 2016

(54) TIME-DOMAIN TEMPERATURE SENSING SYSTEM WITH A DIGITAL OUTPUT AND METHOD THEREOF

(71) Applicants: Chun-Chi Chen, Kaohsiung (TW); Hao-Wen Chen, Kaohsiung (TW); Shih-Hao Lin, Kaohsiung (TW)

(72) Inventors: Chun-Chi Chen, Kaohsiung (TW); Hao-Wen Chen, Kaohsiung (TW); Shih-Hao Lin, Kaohsiung (TW)

(73) Assignee: National Kaohsiung First University of Science and Technology, Kaohsiung (TW)

( * ) Notice: Subject to any disclaimer, the term of this patent is extended or adjusted under 35 U.S.C. 154(b) by 463 days.

(21) Appl. No.: 14/060,715

(22) Filed: Oct. 23, 2013

(65) Prior Publication Data

US 2015/0110157 A1 Apr. 23, 2015

(51) Int. Cl.
| | |
|---|---|
| G01K 3/04 | (2006.01) |
| G01K 7/00 | (2006.01) |
| G01K 7/14 | (2006.01) |
| G01K 7/34 | (2006.01) |

(52) U.S. Cl.
CPC ............... *G01K 7/346* (2013.01); *G01K 7/34* (2013.01)

(58) Field of Classification Search
CPC ............ G01K 7/00; G01K 7/01; G01K 7/14; G01K 3/04; H03K 3/011
USPC ....... 374/170–173, 178, 183, 102, 103, 104, 374/101, 163; 307/106
See application file for complete search history.

(56) References Cited

U.S. PATENT DOCUMENTS

| | | | | |
|---|---|---|---|---|
| 3,713,033 A * | 1/1973 | Frerking | ................. | H03L 1/025 307/651 |
| 4,071,822 A * | 1/1978 | Kamiya | ................. | G01R 19/12 324/111 |
| 4,100,542 A * | 7/1978 | Gallant | ................ | A61B 5/0002 340/518 |
| 4,237,420 A * | 12/1980 | Ebihara | ................. | G01K 1/028 307/651 |
| 4,410,813 A * | 10/1983 | Barker | ............... | H03K 19/0948 327/535 |
| 4,639,681 A * | 1/1987 | Hasegawa | ............. | H03K 5/088 327/166 |
| 4,810,974 A * | 3/1989 | Hulbert | ................... | H03L 7/189 331/1 A |
| 5,955,905 A * | 9/1999 | Idei | ...................... | G11C 7/1072 327/160 |
| 6,008,680 A * | 12/1999 | Kyles | ..................... | H03K 5/131 327/277 |
| 6,146,015 A * | 11/2000 | Weiss | ....................... | G01K 7/42 374/164 |
| 6,278,309 B1 * | 8/2001 | Saeki | ........................ | G06F 1/10 327/153 |
| 6,288,587 B1 * | 9/2001 | Chen | ....................... | G04F 10/00 327/261 |
| 6,292,420 B1 * | 9/2001 | Kim | ..................... | G11C 11/406 365/185.05 |
| 6,469,557 B2 * | 10/2002 | Hirabayashi | ........... | H03K 5/133 327/263 |
| 6,900,679 B2 * | 5/2005 | Watarai | .................... | H03L 7/07 327/158 |

(Continued)

FOREIGN PATENT DOCUMENTS

TW I275782 B 3/2007

*Primary Examiner* — Gail Kaplan Verbitsky
(74) *Attorney, Agent, or Firm* — Alan D. Kamrath; Kamrath IP Lawfirm, P.A.

(57) ABSTRACT

A time-domain temperature sensing system includes a cyclic delay line, a path selection circuit and a counter. The cyclic delay line includes a plurality of logic components connected. The path selection circuit connects with the cyclic delay line and the counter connects with the path selection circuit. The cyclic delay line is operated to sense and convert a temperature into a time pulse to generate a temperature-related time pulse width signal, and the cyclic delay line is further operated to measure the temperature-related time pulse width signal via the path selection circuit. The cyclic delay line is operated to convert the temperature into the time pulse and the counter is further operated to convert the temperature-related time pulse width signal into a digital signal via the path selection circuit, thereby generating a temperature-to-digital signal.

12 Claims, 8 Drawing Sheets

(56) References Cited

U.S. PATENT DOCUMENTS

| | | | | |
|---|---|---|---|---|
| 7,259,637 B1* | 8/2007 | O'Neal | | H03L 1/026 |
| | | | | 331/16 |
| 7,573,340 B2* | 8/2009 | Lee | | G01K 7/32 |
| | | | | 331/56 |
| 8,016,481 B1* | 9/2011 | Avitan | | G01K 7/015 |
| | | | | 327/512 |
| 8,199,015 B2* | 6/2012 | Sandler | | G06K 7/0008 |
| | | | | 340/572.1 |
| 8,217,708 B2* | 7/2012 | Yoshikawa | | G01K 7/01 |
| | | | | 323/316 |
| 8,317,393 B2 | 11/2012 | Chen et al. | | |
| 8,482,330 B2* | 7/2013 | Zhou | | H03K 3/64 |
| | | | | 327/262 |
| 8,931,953 B2* | 1/2015 | Law | | G01K 7/01 |
| | | | | 340/10.1 |
| 2003/0042960 A1* | 3/2003 | Gomm | | G11C 7/22 |
| | | | | 327/276 |
| 2003/0042961 A1* | 3/2003 | Gomm | | G11C 7/22 |
| | | | | 327/276 |
| 2006/0220697 A1* | 10/2006 | Flynn | | H03K 23/68 |
| | | | | 327/105 |
| 2008/0143569 A1* | 6/2008 | DuPuis | | G01L 19/148 |
| | | | | 341/143 |
| 2008/0259997 A1* | 10/2008 | Gardner | | G01K 7/01 |
| | | | | 374/170 |
| 2009/0141770 A1* | 6/2009 | Chen | | G01K 7/00 |
| | | | | 374/170 |
| 2010/0308973 A1* | 12/2010 | Sandler | | G06K 7/0008 |
| | | | | 340/10.3 |
| 2011/0291807 A1* | 12/2011 | Law | | G01K 7/01 |
| | | | | 340/10.1 |
| 2012/0189033 A1* | 7/2012 | Kim | | G01K 7/346 |
| | | | | 374/163 |
| 2013/0272341 A1* | 10/2013 | Lee | | G01K 7/34 |
| | | | | 374/184 |
| 2013/0301680 A1* | 11/2013 | Qiu | | G01K 7/01 |
| | | | | 374/184 |
| 2014/0050250 A1* | 2/2014 | Geng | | H03K 5/159 |
| | | | | 375/146 |
| 2014/0103344 A1* | 4/2014 | Tehranipoor | | G01R 31/2884 |
| | | | | 257/48 |
| 2014/0203851 A1* | 7/2014 | Desai | | H03K 5/1565 |
| | | | | 327/155 |
| 2014/0247253 A1* | 9/2014 | Cho | | G09G 5/003 |
| | | | | 345/204 |
| 2016/0180953 A1* | 6/2016 | Darragh | | G06F 3/0616 |
| | | | | 365/185.11 |

* cited by examiner

TIME-DOMAIN TEMPERATURE SENSING SYSTEM WITH A DIGITAL OUTPUT AND METHOD THEREOF

BACKGROUND OF THE INVENTION

1. Field of the Invention

The present invention relates to a time-domain temperature sensing system with a digital output and method thereof. More particularly, the present invention relates to the time-domain temperature sensing system and method providing a simplified structure.

2. Description of the Related Art

TAIWANESE PATENT PUBLICATION No. I275782, entitled "DIGITAL TEMPERATURE SENSING SYSTEM", discloses a temperature sensing system which is operated for converting a temperature into a corresponding digital signal. The temperature sensing system includes a temperature sensor and a time-to-digital conversion circuit. The temperature sensor is provided for generating a time signal varying with the temperature. The time-to-digital conversion circuit electrically connects with the temperature sensor for converting the time signal into the corresponding digital signal.

Another TAIWANESE PATENT PUBLICATION No. I355485, entitled "TIME DOMAIN DIGITAL TEMPERATURE SENSING SYSTEM AND METHOD THEREOF", discloses an apparatus and method for converting a temperature into a corresponding digital signal. The apparatus includes a temperature-to-time conversion circuit, an adjustable time reference circuit, a time comparator, a control logic circuit and a digital output. The temperature-to-time conversion circuit is provided for sensing the temperature to generate a thermally sensitive time signal with a width proportional to the sensed temperature. The adjustable time reference circuit is provided for digital coding to generate a low thermally-sensitive time signal with a reference time width controlled by a digital input. The time comparator is provided for comparing the two time signals to generate a time comparison output. The control logic circuit is provided to adjust the delay of the adjustable time reference circuit according to the time comparison output to allow the widths of the two time signals to approach approximately. The digital input connects with the digital input of the adjustable time reference circuit and is further assigned to be an output of the temperature sensing system.

However, the digital temperature sensing systems disclosed in TAIWANESE PATENT PUBLICATION Nos. I275782 and I355485 are complicated. Hence, there is a need of improving the digital temperature sensing systems with a simplified circuit. The above-mentioned patents and publications are incorporated herein by reference for purposes including, but not limited to, indicating the background of the present invention and illustrating the state of the art.

As is described in greater detail below, the present invention provides a time-domain temperature sensing system with a digital output and method thereof. A cyclic delay line is applied to sense a temperature and to measure a pulse width, and a path selection circuit is provided to effectively utilize components of the cyclic delay line in such a way to mitigate and overcome the above problem.

SUMMARY OF THE INVENTION

The primary objective of this invention is to provide a time-domain temperature sensing system with a digital output and method thereof. A cyclic delay line is applied to sense a temperature for generating pulses and to measure a pulse width, and a path selection circuit is provided to effectively utilize components of the cyclic delay line in sensing the temperature and measuring time widths (i.e. time intervals). Accordingly, the temperature sensing system and method is successful in reducing the dimensions of the circuit and increasing the effective use of the components.

The time-domain temperature sensing system in accordance with an aspect of the present invention includes:

a cyclic delay line including a plurality of logic components serially connected or parallel-connected;

a path selection circuit connecting with the cyclic delay line; and a counter connecting with the path selection circuit;

wherein the cyclic delay line is operated to sense and convert a temperature into a time pulse to generate a temperature-related time pulse width signal, and wherein the same cyclic delay line is further operated to measure the temperature-related time pulse width signal via the path selection circuit; and wherein the cyclic delay line is operated to convert the temperature into the time pulse and the counter is further operated to convert the temperature-related time pulse width signal into a digital signal via the path selection circuit, thereby generating a temperature-to-digital signal.

The time-domain temperature sensing method in accordance with an aspect of the present invention includes:

arranging the cyclic delay line to connect with the path selection circuit;

operating the cyclic delay line to sense and convert the temperature into the time pulse, thereby generating the temperature-related time pulse width signal;

arranging the counter connecting with the path selection circuit; and further operating the same cyclic delay line to measure the temperature-related time pulse width signal via the path selection circuit and operating the counter to convert the temperature-related time pulse width signal into the digital signal via the path selection circuit, thereby generating the temperature-to-digital signal.

In a separate aspect of the present invention, the cyclic delay line includes a plurality of NOT gates serially connected or parallel-connected to form a NOT-gate-based delay line.

In a further separate aspect of the present invention, the cyclic delay line further includes a pulse-shrinking component which will not affect the function of temperature-to-digital conversion of the cyclic delay line.

In yet a further separate aspect of the present invention, the temperature-related time pulse width signal is fed back to the pulse-shrinking component via the path selection circuit.

In yet a further separate aspect of the present invention, the path selection circuit includes a first multiplexer, a second multiplexer and a D flip-flop.

In yet a further separate aspect of the present invention, the path selection circuit further connects with the cyclic delay line via an EOR gate.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a time-domain temperature sensing system with a digital output and method thereof in accordance with the preferred embodiments of the present invention can be applicable to various digital temperature sensing application systems, including a temperature-monitoring system, for example, and can be suitable for automatic or semi-automatic temperature sensing systems which are not limitative of the present invention.

Figure 1:
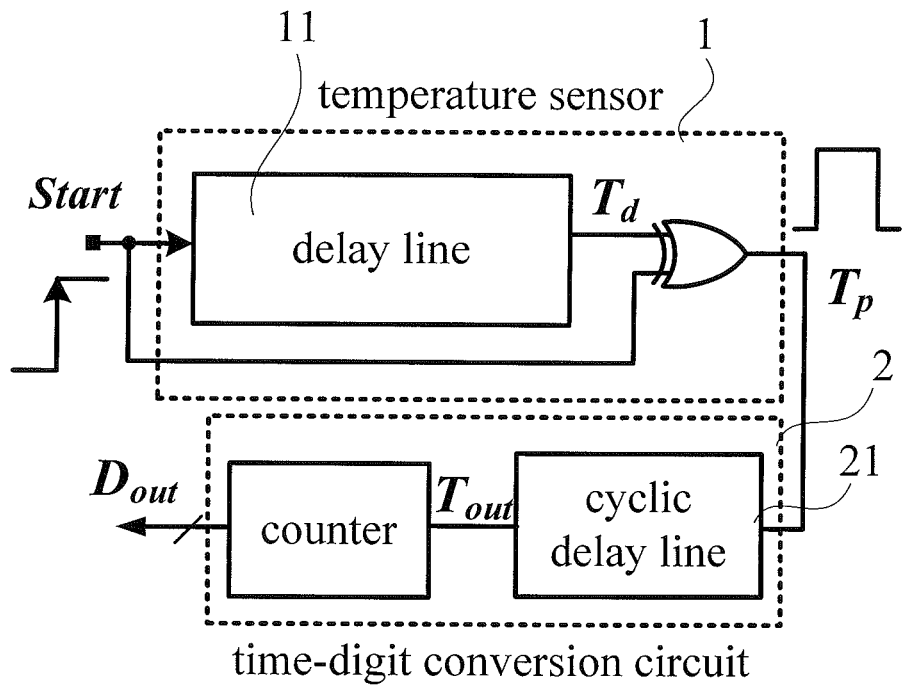
FIG. 1 is a schematic block diagram of a digital temperature-sensing system.
Figure 1A:
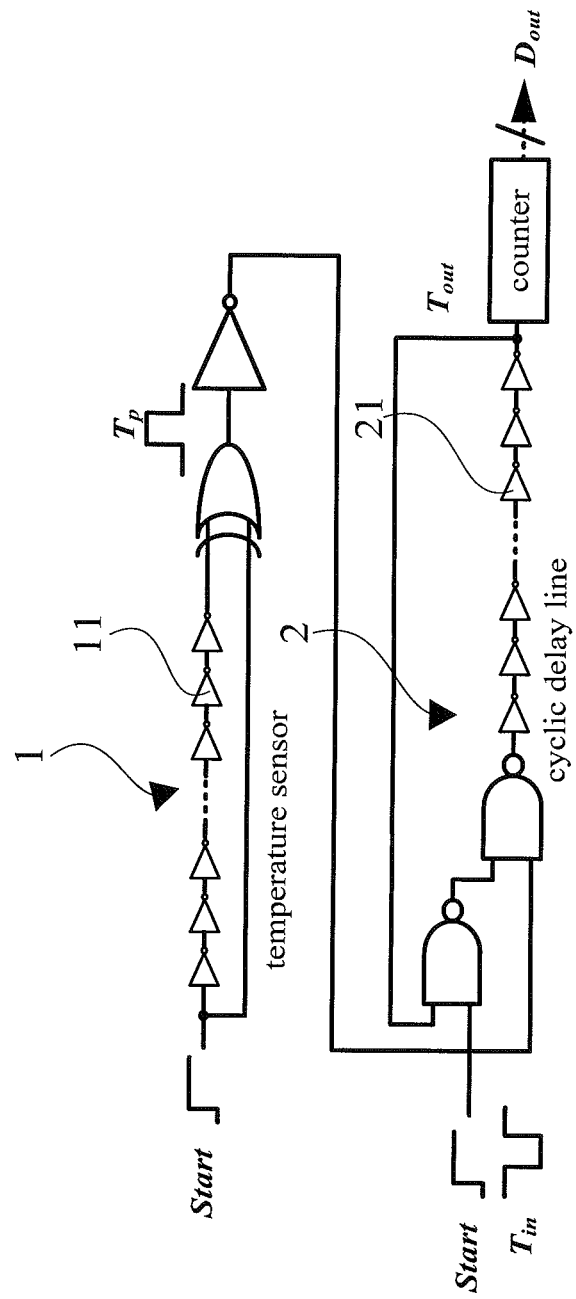
FIG. 1A is a schematic circuitry diagram of the digital temperature-sensing system depicted in FIG. 1.

Referring to FIGS. 1 and 1A, a digital temperature sensing system includes a temperature sensor 1 and a time-to-digital conversion circuit 2. The temperature sensor 1 includes a temperature sensing delay line 11, while the time-to-digital conversion circuit 2 includes a cyclic delay line 21. It will be understood that the digital temperature sensing system includes two delay lines which will result in an increase of the area or dimensions of the circuitry layout.

Figure 2A:
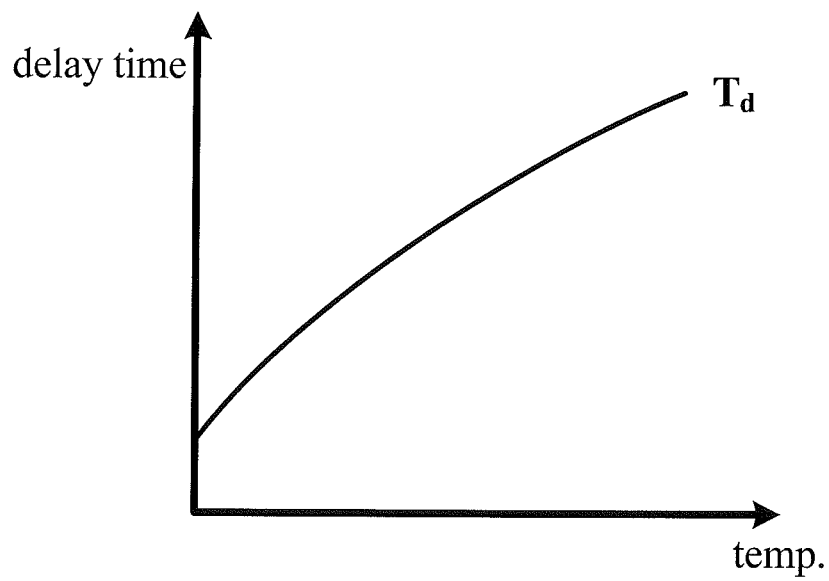
FIG. 2A is a curve illustrating time pulse widths versus temperatures for a cyclic delay line applied in the digital temperature-sensing system.

Turning now to FIGS. 1, 1A and 2A, there is a curve of time pulse widths versus temperatures affected by a length of the cyclic delay line 21 when the digital temperature sensing system is operated to measure a temperature. Referring again to FIG. 2A, a curve $T_p$ represents time pulse widths versus temperatures for the cyclic delay line 21.

Figure 2B:
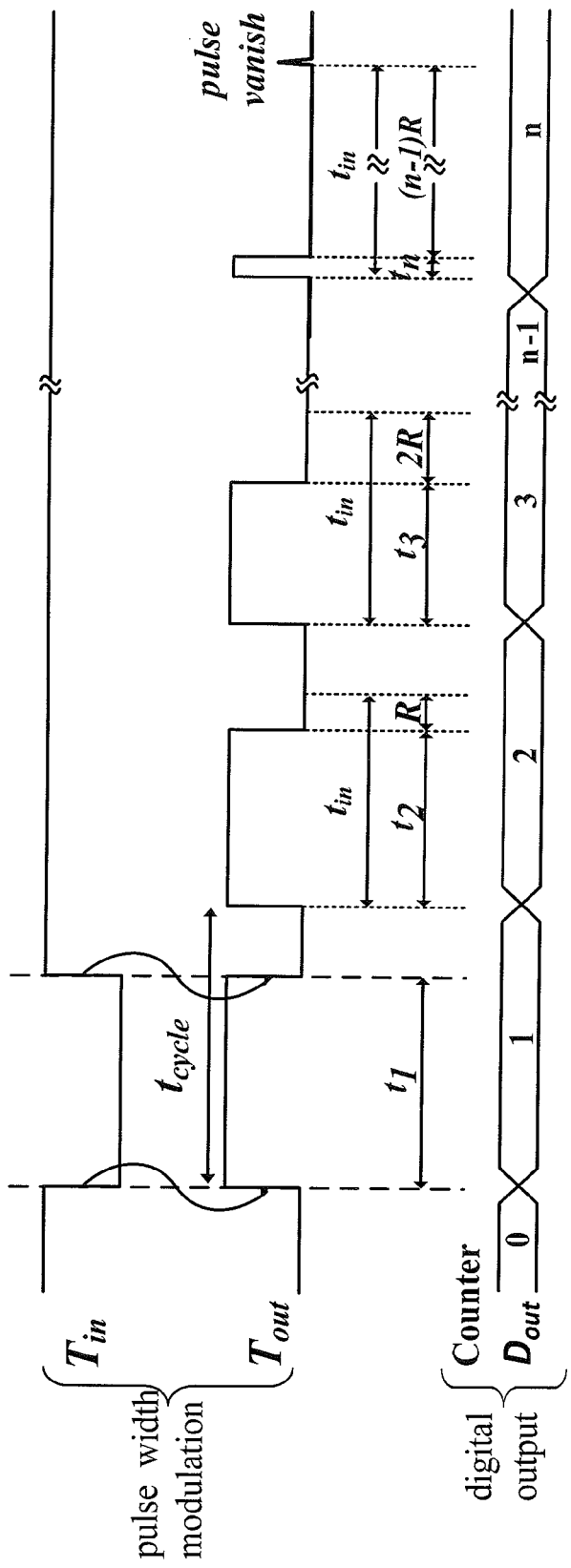
FIG. 2B is a schematic diagram of a series of waveforms of operational signals in the digital temperature-sensing system depicted in FIGS. 1 and 2.

Turning now to FIGS. 1, 1A and 2B, when the time-to-digital conversion circuit 2 is operated to measure a temperature, the operational signals (as best shown in a series of waveforms in FIG. 2B) in the time-to-digital conversion circuit 2 are $T_{in}$ which is a signal input to the cyclic delay line 21 for cyclically shrinking the time pulse widths, $T_{out}$ which is a cyclically shrunk signal of the time pulse widths and $D_{out}$ which is a counting signal measured by a counter.

Figure 3:
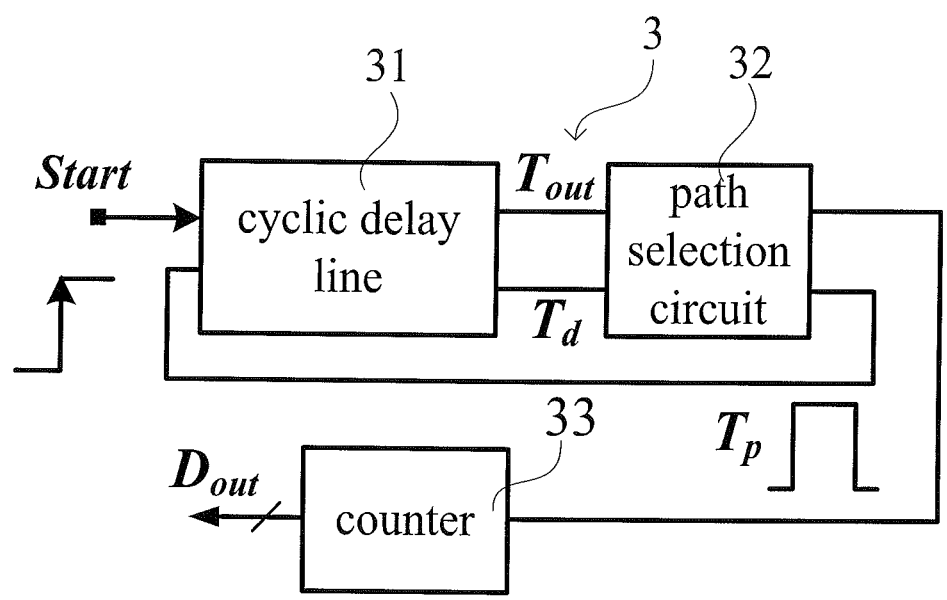
FIG. 3 is a schematic block diagram of a time-domain temperature sensing system with a digital output in accordance with a preferred embodiment of the present invention.
Figure 4:
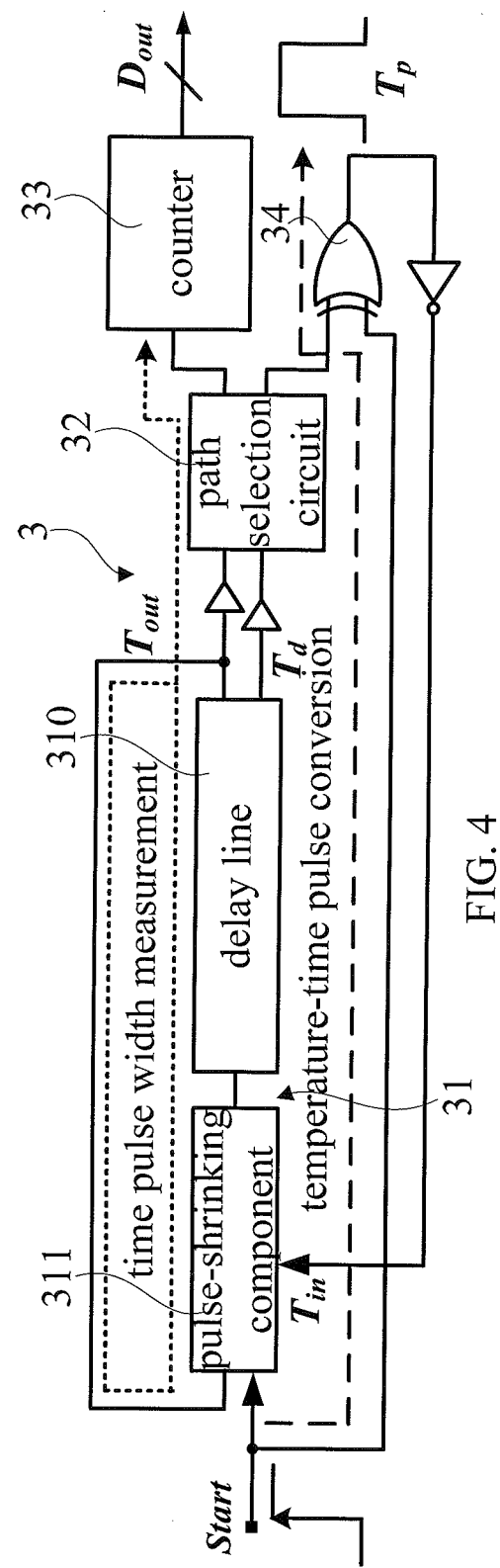
FIG. 4 is a schematically structural diagram of a construction of the time-domain temperature sensing system in accordance with the preferred embodiment of the present invention.

Turning now to FIGS. 3 and 4, by way of example, a time-domain temperature sensing system 3 with a digital output in accordance with a preferred embodiment of the present invention mainly includes a cyclic delay line 31, a path selection circuit 32, a counter 33 and an EOR gate (exclusive OR gate) 34 which are electronically connected suitably.

Still referring to FIGS. 3 and 4, a time-domain temperature sensing method in accordance with the preferred embodiment of the present invention includes: arranging the cyclic delay line 31 to connect with the path selection circuit 32. The cyclic delay line 31 is provided to sense and convert a temperature into a corresponding time pulse. The path selection circuit 32 is provided to receive an operational signal from the cyclic delay line 31 for selection.

Still referring to FIGS. 3 and 4, the time-domain temperature sensing method in accordance with the preferred embodiment of the present invention includes: arranging the path selection circuit 32 to connect with the counter 33. The counter 33 is provided to convert an operational signal into a digital signal by counting.

Referring again to FIGS. 3 and 4, by way of example, the cyclic delay line 31 includes a plurality of NOT gates serially connected or parallel-connected to form a delay line 310. The time-domain temperature sensing system in accordance with the preferred embodiment of the present invention is only provided with a single delay line which is repeatedly operated in different, functional uses. Accordingly, the time-domain temperature sensing system is successful in simplifying the circuitry layout, reducing the dimensions of the circuit and increasing the effective use of the components. In another preferred embodiment, the cyclic delay line 31 includes a plurality of NOT gates or logical components serially connected or parallel-connected to form a delay line. By way of example, the NOT gates of the cyclic delay line 31 serially connects to form a NOT-gate-based delay line. The cyclic delay line 31 further includes a pulse-shrinking component 311 which is operated to provide a function of controlling a degree of shrinkage of pulses, as best shown in FIG. 4. The path selection circuit 32 further connects with the cyclic delay line 31 via the EOR gate 34.

Figure 5:
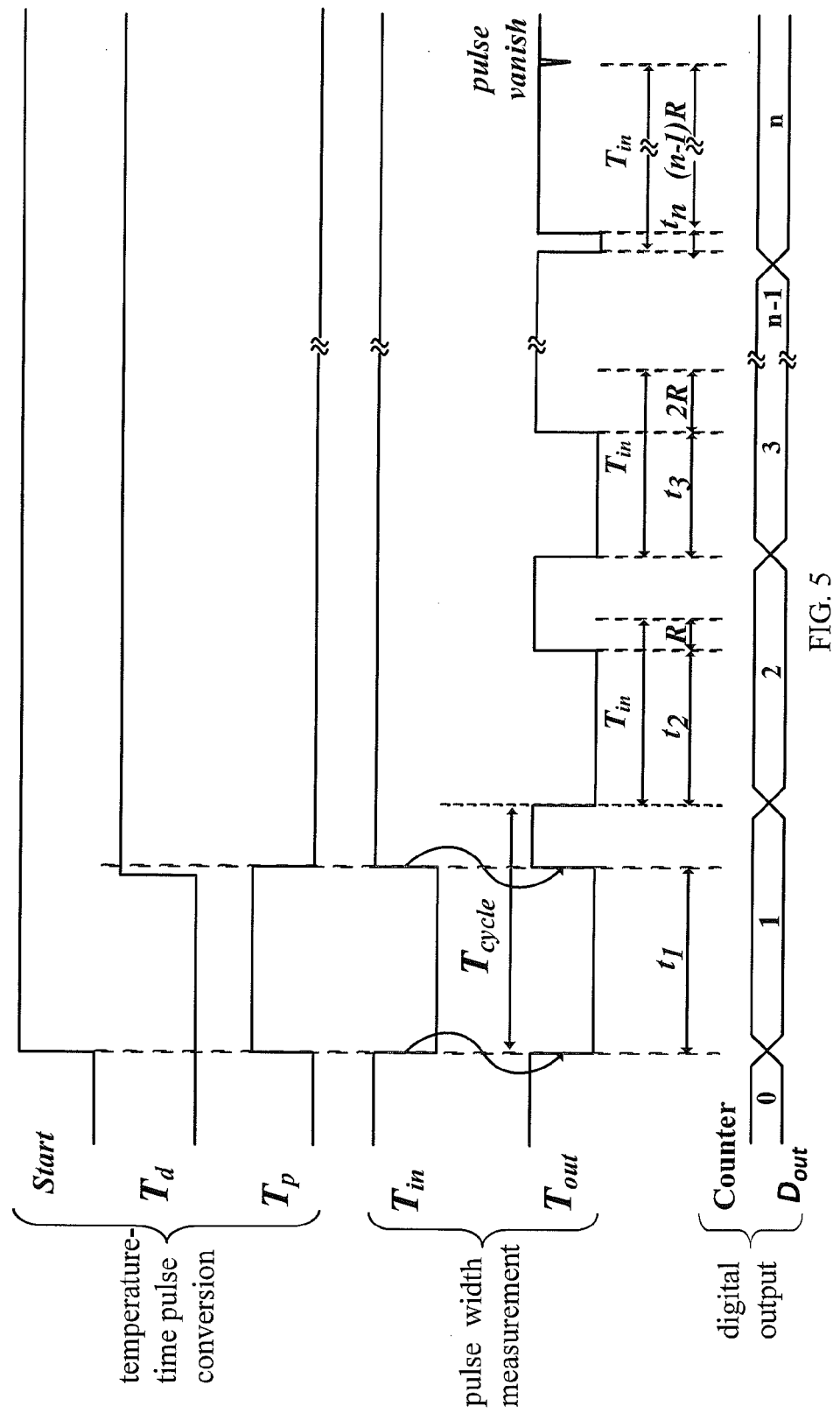
FIG. 5 is a schematic diagram of a series of waveforms of operational signals in the time-domain temperature sensing system in accordance with the preferred embodiment of the present invention.

Turning now to FIGS. 4 and 5, when the time-domain temperature sensing system 3 is operated to measure a temperature, the operational signals (as best shown in a series of waveforms in FIG. 5) in the time-domain temperature sensing system 3 are: Start which is a trigger signal, $T_d$ which is a time delay signal corresponding to a length of the cyclic delay line 31 and relating to the measured temperature, $T_p$ which is a time pulse signal corresponding to $T_d$ signal, $T_{in}$ which is an inverting signal with respect to $T_p$ signal and input to the cyclic delay line 31 for cyclically shrinking the time pulse widths, R which is an amount of shrinkage in each cycle performed as a precision of time scale, $T_{out}$ which is a cyclically shrunk signal of the time pulse widths in the cyclic delay line 31, and $D_{out}$ which is a counting signal measured by the counter 33.

Figure 6:
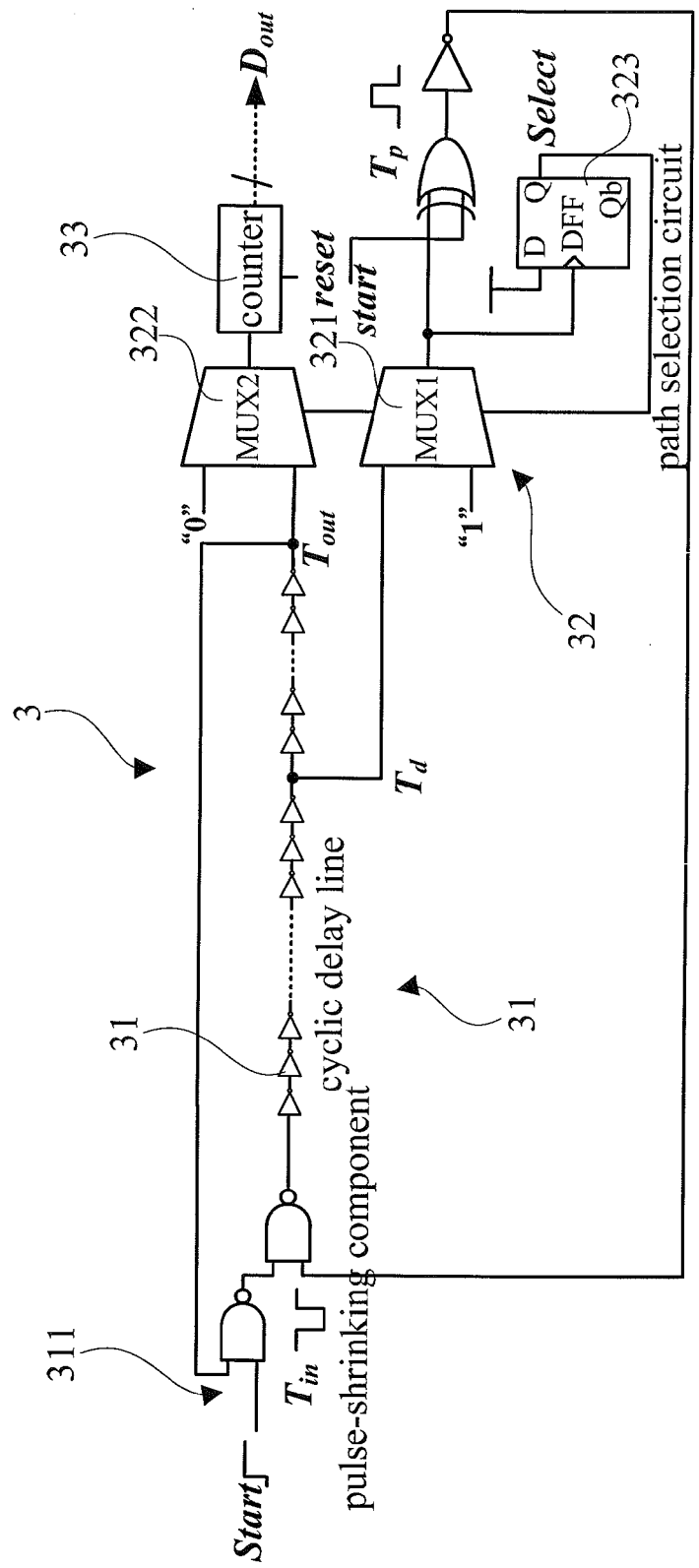
FIG. 6 is a schematic circuitry diagram of the time-domain temperature sensing system in accordance with the preferred embodiment of the present invention.

FIG. 6 shows a schematic circuitry diagram of the time-domain temperature sensing system in accordance with the preferred embodiment of the present invention similar to that shown in FIG. 1A. Referring to FIG. 6, the time-domain temperature sensing system 3 is provided with the cyclic delay line 31 as well as a single delay line which can be performed as a double function, including a temperature-to-time pulse conversion function and a measuring function of the temperature-related time pulse width signals.

Referring again to FIGS. 4 and 6, the time-domain temperature sensing method in accordance with the preferred embodiment of the present invention includes: operating the cyclic delay line 31 to sense and convert the temperature into the time pulse, thereby generating a temperature-related time pulse width signal $T_p$, as best shown in the lower portion in FIG. 4. The cyclic delay line 31 can be repeatedly operated via the path selection circuit 32 for processing the temperature-related time pulse width signal $T_p$.

Referring again to FIGS. 4 and 6, the time-domain temperature sensing method in accordance with the preferred embodiment of the present invention includes: further operating the cyclic delay line 31 to measure the temperature-related time pulse width signal via the path selection circuit 32 and operating the counter 33 to convert the temperature-related time pulse width signal into the digital signal via the path selection circuit 32, thereby generating the temperature-to-digital signal, as best shown in the upper portion in FIG. 4.

Referring back to FIGS. 1A and 6, in order to simplify the entire structure, the time-domain temperature sensing system 3 of the present invention only requires a single delay line of the cyclic delay line 31 in comparing with the temperature sensing delay line 11 and the cyclic delay line 21 of the temperature sensor 1.

Figure 7:
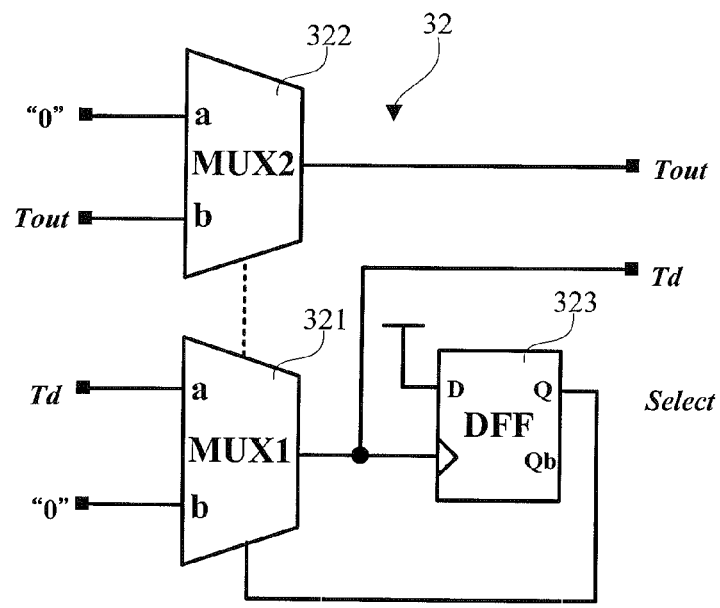
FIG. 7 is a schematic circuitry diagram of a path selection circuit applied in the time-domain temperature sensing system in accordance with the preferred embodiment of the present invention.

FIG. 7 shows a schematic circuitry diagram of an example of the path selection circuit 32 applied in the time-domain temperature sensing system 3 in accordance with the preferred embodiment of the present invention, as best shown in FIG. 6. Referring now to FIGS. 6 and 7, the path selection circuit 32 includes a first multiplexer 321, a second multiplexer 322 and a D flip-flop 323 which are electronically connected.

Referring now to FIGS. 6 and 7, in operation, when an output "Q" of the D flip-flop 323 is reset "0", the paths of the first multiplexer 321 and the second multiplexer 322 are designated at pins "a" and an output of $T_{out}$ becomes "0". Thus, the time delay signal $T_d$ supplied from the cyclic delay line 31 is applied to generate the time pulse width signal $T_p$. The D flip-flop 323 is rapidly driven to convert the output "Q" into "1", as best shown by the dotted line in the lower portion in FIG. 4, which is a first operation of the path selection circuit 32. When the output "Q" of the D flip-flop 323 is converted into "1", the paths of the first multiplexer 321 and the second multiplexer 322 are changed to pins "b" and a measurement of the temperature-related time pulse width starts such that the output of $T_{out}$ is a measured time pulse. Thus, the counter 33 starts to count and convert the measured time pulse into the digital signal $D_{out}$, as best shown by the dotted line in the upper portion in FIG. 4.

Figure 8:
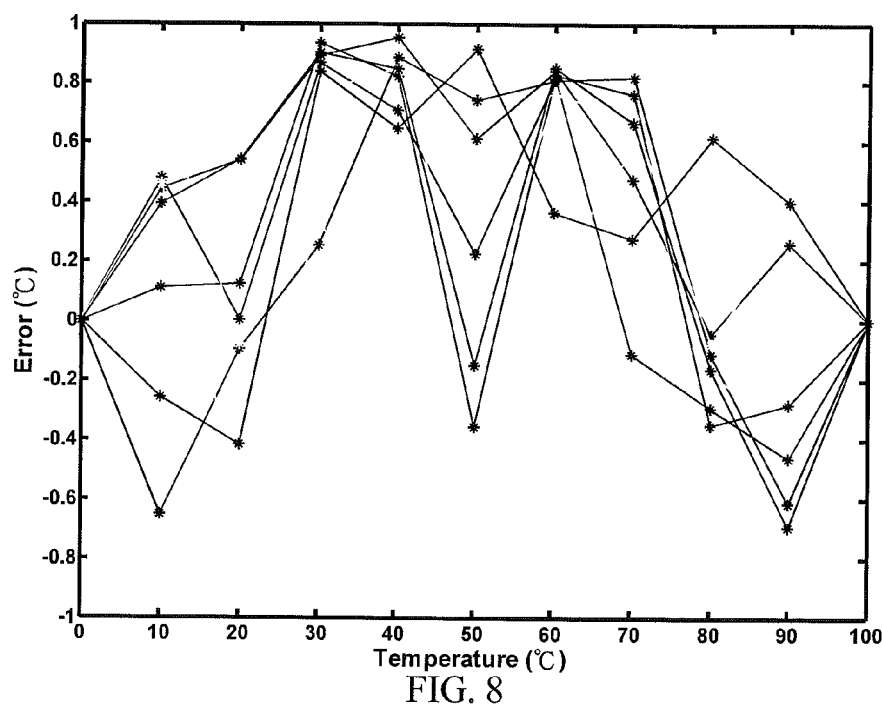
FIG. 8 is a chart illustrating errors measuring in the time-domain temperature sensing system in accordance with the preferred embodiment of the present invention in relation to reference temperatures.

FIG. 8 shows a chart illustrating temperature errors measuring in various time-domain temperature sensing systems in relation to reference temperatures. Referring now to FIG. 8, the time-domain temperature sensing system is implemented in eight different chips. The time-domain temperature sensing systems provided in the eight chips are applied to measure temperature within 0 to 100 degrees centigrade and the temperature errors measured by the eight chips in relation to reference temperatures are shown.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A time-domain temperature sensing system comprising:
a cyclic delay line including a plurality of logic components connected;
a path selection circuit connecting with the cyclic delay line and configured for selecting a first path and a second cyclic path, with the first path connecting with a first end of the cyclic delay line via the path selection circuit, with a first end of the second cyclic path connecting with the first end the cyclic delay line via the path selection circuit and a second end of the second cyclic path connecting with a second end of the cyclic delay line; and
a counter connecting with the path selection circuit via the first path;
wherein the cyclic delay line is configured to sense and convert a temperature into a time pulse along the second cyclic path to generate a temperature-related time pulse width signal, wherein the cyclic delay line is further configured to measure the temperature-related time pulse width signal via the path selection circuit; and
wherein the cyclic delay line is configured to convert the temperature into the time pulse along the second cyclic path and the counter is further configured to convert the temperature-related time pulse width signal into a digital signal via the path selection circuit along the first path, thereby generating a temperature-to-digital signal.

2. The time-domain temperature sensing system as defined in claim 1, wherein the cyclic delay line includes a plurality of NOT gates connected to form a NOT-gate-based delay line.

3. The time-domain temperature sensing system as defined in claim 1, wherein the cyclic delay line further includes a pulse-shrinking component connected between the second cyclic path and the second end of the cyclic delay line.

4. The time-domain temperature sensing system as defined in claim 3, wherein the temperature-related time pulse width signal is fed back to the pulse-shrinking component via the path selection circuit and the second cyclic path.

5. The time-domain temperature sensing system as defined in claim 1, wherein the path selection circuit includes a first multiplexer, a second multiplexer and a D flip-flop.

6. The time-domain temperature sensing system as defined in claim 1, wherein the path selection circuit further connects with the cyclic delay line via an EOR gate.

7. A time-domain temperature sensing method comprising:
arranging a cyclic delay line to connect with a path selection circuit;
selecting a first path and a second cyclic path, with the first path connecting with a first end of the cyclic delay line via the path selection circuit, with a first end of the second cyclic path connecting with the first end of the cyclic delay line via the path selection circuit and a second end of the second cyclic path connecting with a second end of the cyclic delay line;

sensing and converting a temperature into a time pulse along the second cyclic path, thereby generating a temperature-related time pulse width signal;

arranging a counter connecting with the path selection circuit via the first path; and measuring the temperature-related time pulse width signal via the path selection circuit and operating the counter to convert the temperature-related time pulse width signal into a digital signal via the path selection circuit along the first path, thereby generating a temperature-to-digital signal.

8. The time-domain temperature sensing method as defined in claim 7, wherein arranging the cyclic delay line includes a plurality of NOT gates connected to form a NOT-gate-based delay line.

9. The time-domain temperature sensing method as defined in claim 7, wherein arranging the cyclic delay line further includes a pulse-shrinking component connected between the second cyclic path and the second end of the cyclic delay line.

10. The time-domain temperature sensing method as defined in claim 9, wherein the temperature-related time pulse width signal is fed back to the pulse-shrinking component via the path selection circuit and the second cyclic path.

11. The time-domain temperature sensing method as defined in claim 7, wherein the path selection circuit includes a first multiplexer, a second multiplexer and a D flip-flop.

12. The time-domain temperature sensing method as defined in claim 7, wherein the path selection circuit further connects with the cyclic delay line via an EOR gate.

* * * * *